United States Patent [19]

Kitto

[11] Patent Number: 4,520,170

[45] Date of Patent: May 28, 1985

[54] METHOD FOR REINFORCING PERFLUOROELASTOMER COMPOSITIONS

[75] Inventor: David P. Kitto, Newark, Del.

[73] Assignee: E. I. Du Pont de Nemours and Company, Wilmington, Del.

[21] Appl. No.: 420,478

[22] Filed: Sep. 20, 1982

[51] Int. Cl.³ .................... C08L 27/16; C08L 27/18; C08L 27/20

[52] U.S. Cl. .................... 525/200; 525/199; 525/197; 525/198

[58] Field of Search .................... 525/199, 200

[56] References Cited

U.S. PATENT DOCUMENTS

| | | | |
|---|---|---|---|
| 3,445,393 | 5/1969 | Hinds | 252/58 |
| 3,467,638 | 9/1969 | Pattison | 260/87.5 |
| 3,546,186 | 12/1970 | Gladding et al. | 260/80.73 |
| 3,655,611 | 4/1972 | Mueller et al. | 260/41 |
| 3,682,872 | 8/1972 | Brizzolara et al. | 260/80.76 |
| 3,733,295 | 5/1973 | Martin et al. | 260/41.5 R |
| 3,872,045 | 3/1975 | Field et al. | 260/31.2 |
| 3,929,934 | 12/1975 | Moore et al. | 260/884 |
| 4,035,565 | 7/1977 | Apotheker et al. | 526/249 |
| 4,094,949 | 6/1978 | Yokokawa et al. | 264/234 |
| 4,200,568 | 4/1980 | Trautvetter et al. | 260/42.47 |
| 4,255,523 | 3/1981 | Ukihashi et al. | 521/27 |
| 4,281,092 | 7/1981 | Breazeale | 526/247 |

FOREIGN PATENT DOCUMENTS

| | | |
|---|---|---|
| 832851 | 12/1975 | Belgium . |
| 2454851 | 5/1975 | Fed. Rep. of Germany . |
| 2624893 | 12/1976 | Fed. Rep. of Germany . |
| 5710895 | 4/1977 | Japan . |
| 53-008650 | 1/1978 | Japan . |
| 53-046342 | 4/1978 | Japan . |
| 53-139661 | 12/1978 | Japan . |
| 53-139660 | 12/1978 | Japan . |

OTHER PUBLICATIONS

Kalb et al., "Polymerization Reactions and New Polymers", Advances in Chemistry Series, No. 129, 13–26, (1973).

Primary Examiner—Carman J. Seccuro

[57] ABSTRACT

Fiber reinforced perfluoroelastomer parts having high multidirectional tear strength are prepared by blending the fiber with the elastomer, pulverizing the blend into a powder, and molding and press-curing the powder into the desired shape.

10 Claims, 1 Drawing Figure

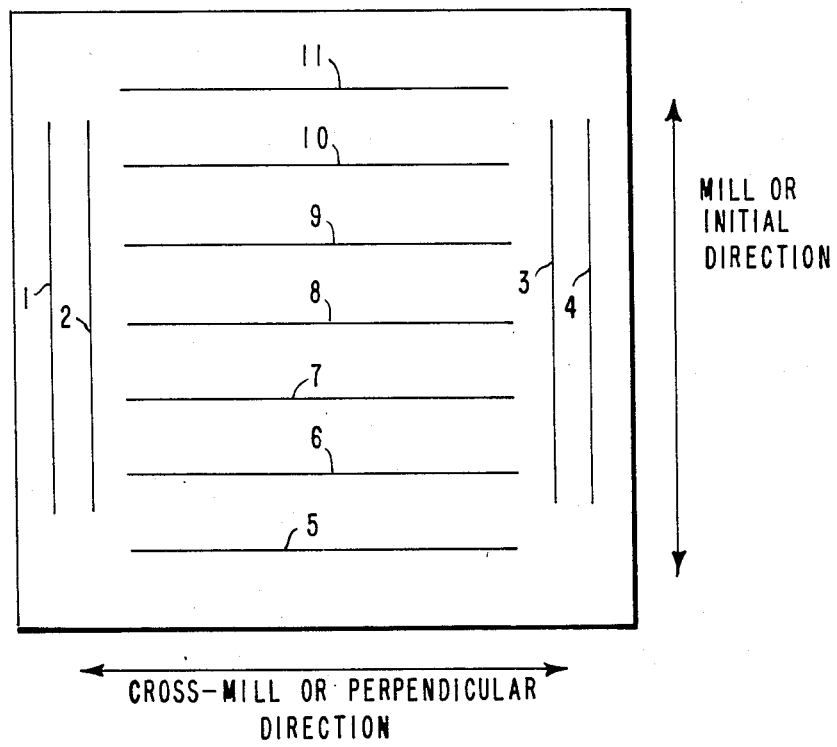

METHOD FOR REINFORCING PERFLUOROELASTOMER COMPOSITIONS

DESCRIPTION

1. Technical Field

This invention relates to a method for reinforcing certain perfluoroelastomer compositions by incorporating therein by a particular process certain fibrous materials, thereby significantly improving the physical properties of the finished products made from such compositions. In particular, the invention relates to the preparation of reinforced perfluoroelastomer parts with high multidirectional tear strength. Such parts will be useful as seals, gaskets, diaphragms and liners wherever extraordinary resistance to heat and corrosive fluids is required, and especially where such parts require high multidirectional tear strength. This invention relates specifically to a method for preparing reinforced perfluoroelastomer parts wherein the reinforcing material is evenly and randomly dispersed in the perfluoroelastomer and is in intimate contact therewith, thus significantly improving the physical properties of the part evenly, equally and in all directions throughout the part.

2. Background Art

Kalb et al., "Polymerization Reactions and New Polymers", Advances in Chemistry Series, No. 129, 13–26 (1973) discloses certain copolymers of tetrafluoroethylene, perfluoro(methyl vinyl ether) and a third monomer selected from the group consisting of:
(a) perfluoro(4-cyanobutyl vinyl ether),
(b) perfluoro(4-carbomethoxybutyl vinyl ether),
(c) perfluoro(2-phenoxypropyl vinyl ether), and
(d) perfluoro(3-phenoxypropyl vinyl ether), Kalb et al. also discloses the outstanding solvent and chemical resistance that can be obtained with these elastomers.

U.S. Pat. No. 3,546,186 granted Dec. 8, 1970 to Gladding and Sullivan, discloses certain vulcanizable copolymers of substituted perfluorovinyl ether. In particular, among the many and varied copolymers disclosed by Gladding and Sullivan, there are disclosed terpolymers derived from tetrafluoroethylene, perfluoromethyl perfluorovinyl ether and a cure-site monomer which can be, among other things, perfluoro(4-cyanobutyl vinyl ether) or perfluoro(4-carbomethoxybutyl vinyl ether).

U.S. Pat. No. 3,467,638, granted Sept. 16, 1969 to Pattison, discloses certain vulcanizable copolymers of substituted perfluorovinyl ether. In particular, among the many and varied copolymers disclosed by Pattison, there are disclosed terpolymers derived from tetrafluoroethylene, perfluoromethyl perfluorovinyl ether and a cure-site monomer which can be, among other things, perfluoro(2-phenoxypropyl vinyl ether).

U.S. Pat. No. 3,682,872 granted Aug. 8, 1972 to Brizzolara and Quarles, discloses certain vulcanizable copolymers of substituted perfluorovinyl ether. In particular, among the many and varied copolymers disclosed by Brizzolara and Quarles there are disclosed terpolymers derived from tetrafluoroethylene, perfluoromethyl perfluorovinyl ether and, as a cure-site monomer, perfluoro(3-phenoxypropyl vinyl ether).

U.S. Pat. No. 4,281,092, granted July 28, 1981 to Breazeale, discloses certain vulcanizable copolymers of tetrafluoroethylene, perfluoromethyl perfluorovinyl ether and a cure-site monomer which can be perfluoro(8-cyano-5-methyl-3,6-dioxa-1-octene).

U.S. Pat. No. 4,035,565, granted July 12, 1977 to Apotheker et al. discloses, among other things, certain vulcanizable copolymers of up to 3 mole percent of a bromine containing olefin, tetrafluoroethylene, and a perfluoroalkyl perfluorovinyl ether.

Perfluoroelastomer compositions based on the polymers disclosed in the background art summarized above can be improved by the incorporation of fibrous materials therein by the process of the present invention.

DISCLOSURE OF THE INVENTION

The present invention relates to a method for reinforcing certain vulcanizable perfluoroelastomer compositions, wherein the perfluoroelastomer is a terpolymer derived from tetrafluoroethylene, perfluoromethyl perfluorovinyl ether and a cure-site monomer, thus permitting the manufacture of finished perfluoroelastomer parts with high multidirectional tear strength as compared with unreinforced perfluoroelastomer parts or perfluoroelastomer parts reinforced by conventional techniques.

The terpolymers used in the parts made by the process of the present invention are substantially as described by Kalb et al., Gladding and Sullivan, Pattison, Brizzolara and Quarles, Breazeale, and Apotheker et al. in the reference cited above and generally comprise copolymerized units of about 53–79.8 mole percent of tetrafluoroethylene (TFE), about 20–45 mole percent of perfluoromethyl perfluorovinyl ether (PMVE), and 0.2–2 mole percent of a cure site monomer selected from the group consisting of:
(a) perfluoro(4-cyanobutyl vinyl ether),
(b) perfluoro(4-carbomethoxybutyl vinyl ether),
(c) perfluoro(2-phenoxypropyl vinyl ether),
(d) perfluoro(3-phenoxypropyl vinyl ether),
(e) perfluoro(8-cyano-5-methyl-3,6-dioxa-1-octene), and
(f) a bromo-containing olefin.

Such terpolymers can be prepared by the procedures taught in the references cited above, and to the extent necessary to enable one of ordinary skill in the art to prepare the compositions of the present invention, the subject matter of Kalb et al. "Polymerization Reactions and New Polymers", Advances in Chemistry Series, No. 129, 13–26 (1973), U.S. Pat. No. 3,546,186; U.S. Pat. No. 3,467,638; U.S. Pat. No. 3,682,872; U.S. application Ser. No. 83,751 and U.S. Pat. No. 4,035,565 are hereby incorporated by reference into the present application. Preferably the compositions of the present invention are based upon terpolymers in which the cure-site monomers is perfluoro(2-phenoxypropyl vinyl ether), or perfluoro(8-cyano-5-methyl-3,6-dioxa-1-octene) and most preferably, they are based on such terpolymers in which the proportions of the monomers are about 65.4–73.6 mole percent TFE, 26–34 mole percent PMVE, and the remainder is perfluoro(2-phenoxypropyl vinyl ether) or perfluoro(8-cyano-5-methyl-3,6-dioxa-1-octene). It should be understood that exact determination of the monomer proportions is difficult and that the values given are estimates based on infrared spectra.

As with conventional vulcanizable fluoroelastomer compositions, it is frequently desirable to mix fillers such as carbon black or one or more non-black fillers such as titanium dioxide, zirconium dioxide, silica, clay and asbestos, reinforcing agents, stabilizers, plasticizers, lubricants or processing aids with the elastomer prior to vulcanization.

Typical reinforcing agents include polytetrafluoroethylene (PTFE) and copolymers of hexafluoropropylene and tetrafluoroethylene. Fibriles of fibrillated PTFE are especially preferred where increased tear strength is required without any significant sacrifice in resistance to environmental attack or in resistance to heat and corrosive fluids. Such reinforcing agents are typically incorporated into the uncured perfluoroelastomer by blending the reinforcing agent and any other desired compounding ingredients with the perfluoroelastomer on a rubber mill at controlled temperature.

It has been found, however, that when fibrillatable PTFE reinforcing agent is processed in the manner described above, a product results in which the tear strength perpendicular to the direction of milling (the perpendicular direction) is significantly increased while tear strength parallel to the direction of milling (the initial direction) is not significantly increased. It is believed that this is due to orientation of the reinforcing agent substantially parallel to the direction of milling. In some end use applications, such as in diaphragms, improved multidirectional tear strength (i.e., tear strength in both the initial and the perpendicular directions) is important.

It has been found that such improved multidirectional tear strength can be achieved by the process of the present invention. In particular, it has been found that such results can be achieved by (1) preparing milled materials substantially as described above, (2) pulverizing such milled materials, preferably at cyrogenic temperatures, (3) placing the particles resulting from step (2) above into a mold and press curing into the desired shape, preferably under vacuum to minimize or eliminate the possibility of air being entrapped in the finished article, followed by (4) standard post-curing of the press-cured article.

The initial step of blending the reinforcing agent with the perfluoroelastomer and any other desired compounding ingredients, e.g. conventional fillers, extenders, curing agents and accelerators, is conveniently carried out in a relatively high shear mixing device, such as a rubber mill or a Banbury mixer at a temperature of about 50°–80° C. for 15–60 minutes. Such blending conditions will cause the reinforcing agent to be fibrillated while it is being blended with the elastomer. Alternatively, reinforcing agent can be fibrillated prior to blending with the fluoroelastomer.

The reinforcing agent will be fibriles of fibrillated polytetrafluoroethylene on lengths of less than about 1 millimeter. One example of fibrilatable polytetrafluoroethylene resin that is commercially available is E. I. du Pont de Nemours and Company's "Teflon" T8A. Generally 1 to 40 parts of reinforcing agent will be blended with 100 parts of the perfluoroelastomer. 2 to 20 parts is preferred. Too little reinforcing agent will result in insufficient increase in tear strength of the finished product. Too much will result in lower tensile and elongation properties. It is important that the reinforcing agent be blended with the perfluoroelastomer prior to cryogenic comminution of the milled material. Blending of the reinforcing agent with the perfluoroelastomer during pulverization, or mixing the reinforcing agent with the particles resulting from the cryogenic pulverizaton, followed by press and post-curing of the powdered fluoroelastomer/reinforcing agent mixture does not provide significant increase in tear strength.

The pulverization of the perfluoroelastomer milled material can be conducted, for example, by cutting the milled material into pieces not greater than ¼ inch (6.35 mm) at room temperature in an Abbe cutter, followed by pulverization of the ¼ inch (6.35 mm) particles in a Bantam Micro Pulverizer operating at a rotor speed of 14,000 r.p.m. at liquid nitrogen temperature. Following pulverization, the product should be dried, for example in an oven at 60°–120° C., preferably in a nitrogen atmosphere, although dry air or vacuum is also suitable. Molding of a perfluoroelastomer containing moisture may result in blowing, sponging or other undesirable mold characteristics. Perfluoroelastomer particles resulting from the cryogenic pulverization should pass through a screen having an opening of 1.65 mm (10 mesh) or less, preferably 16 mesh (0.991 mm opening). Typical samples pulverized as above have been found to have a particle size distribution as follows:

particles greater than 14 mesh (1.17 mm)—none
particles greater than 24 mesh (0.701 mm)—0–4%
particles greater than 32 mesh (0.495 mm)—28–42%
particles greater than 65 mesh (0.208 mm)—38–58%
particles greater than 100 mesh (0.147 mm)—6–9%
particles greater than 150 mesh (0.104 mm)—0–6%
with residual fines of 1–5%

Press curing and post-curing are conducted as would be normal for a perfluoroelastomer that has not been cryogenically pulverized. For example, see Kalb et al., Advances in Chemistry Series No. 129, pp 13–26 (1973).

The following examples illustrate on a comparative basis the tear strength properties that will be achieved in unmodified perfluoroelastomer, perfluoroelastomer reinforced by conventional means with polytetrafluoroethylene, and perfluoroelastomer reinforced with polytetrafluoroethylene by the process of the present invention. In each of the following examples, standard elastomer processing and testing procedures were used. Compounds were milled on a standard two-roll rubber mill at 60° C. Slabs were sheeted off the mill at the desired thickness. Slabs (152 mm×152 mm×2 mm) were used to prepare die-cut test samples having dimensions as specified in ASTM D-624-B, the test samples being taken from positions within each slab as shown in the FIGURE. Tear strength was measured on an Instron Corp. tensile tester and as described more fully in ASTM D-624B. Polymer composition, compounding ingredients, press-curing and post-curing conditions were as described in the following examples. All parts and percentages are by weight and temperatures are in degrees Celsius unless specified otherwise. Measurements made in other than S.I. units have been converted to S.I. units and rounded as appropriate.

EXAMPLE 1

No Reinforcement

A terpolymer of tetrafluoroethylene, perfluoromethylvinyl ether (PMVE), and perfluoro(2-phenoxypropyl vinyl ether) (P2PVE) was prepared by and isolated by the procedure described in U.S. Pat. No. 3,467,638. This terpolymer contained 34% PMVE and 0.5% P2PVE. 1100 grams of this terpolymer were then compounded with 33 grams of 18 crown-6 (1,4,7,10,13,16-hexaoxacyclooctadecane), 49.5 grams of potassium salt of bisphenol AF (4,4'-hexafluoroisopropylidenediphenol), and 236.5 grams of "Titanox" 2071 (titanium dioxide) on a standard rubber roll mill at 60° C. Hereafter this will be called compound I.

This milled slab was annealed at 100° C. for 15 minutes. A die cut sample was then placed in a slab mold at room temperature. The mold was placed in a resistance heated press at room temperature under 76,000 kPa pressure. Temperature was increased to 177° C. in 20 minutes and then held constant for 100 minutes. The resulting part was postcured under $N_2$ using the following temperature program:

| Time | Temperature |
| --- | --- |
| 0 to 6 hrs. | 23→204° C. |
| 6 to 24 hrs. | 204° C. |
| 24 to 30 hrs. | 204→288° C. |
| 30 to 48 hrs. | 288° C. |

Test samples were then labeled and removed from the postcured sheet as shown in the FIGURE.

The tear test results at room temperature were:

| Direction | Sample | Tear Strength kN/m |
| --- | --- | --- |
| Mill | 2 | 22.06 |
| Mill | 3 | 25.39 |
| Cross Mill | 6 | 25.04 |
| Cross Mill | 7 | 25.21 |
| Cross Mill | 8 | 25.56 |
| Cross Mill | 11 | 25.49 |

EXAMPLE 2

Reinforcement By Milling Perfluoroelastomer 3.2 pph (parts per hundred) of "Teflon" T8A was milled into Compound I found in Example 1 at 60° C. Hereafter, this is called Compound II. This reinforced milled slab was annealed at 100° C. for 15 minutes.

A die cut sample was then placed in a mold at room temperature. The mold was placed in a resistance heated press at room temperature under 76,000 kPa pressure. Temperature was increased to 177° C. in 20 minutes and then held constant for 100 minutes. The resulting part was postcured under $N_2$ using the following temperature program:

| Time | Temperature |
| --- | --- |
| 0 to 6 hrs. | 23→204° C. |
| 6 to 24 hrs. | 204° C. |
| 24 to 30 hrs. | 204→288° C. |
| 30 to 48 hrs. | 288° C. |

Test samples were then labeled and removed from the postcured sheet as shown in the FIGURE.

The tear test results at room temperature were:

| Direction | Sample | Tear Strength kN/m |
| --- | --- | --- |
| Mill | 2 | 36.07 |
| Mill | 3 | 38.00 |
| Cross Mill | 6 | 23.81 |
| Cross Mill | 7 | 24.34 |
| Cross Mill | 8 | 24.86 |

In Examples 3–5 below there is no mill direction and cross-mill direction, because the milled material was pulverized. Accordingly, Samples 1–4 in each of these Examples will be considered to be taken from the initial direction and Samples 5–10 were taken from a direction perpendicular to the initial direction, as shown in the FIGURE.

EXAMPLE 3

Reinforcement By Pulverizing Milled Perfluoroelastomer

Compound II from Example 2 was then pulverized in a hammer mill at −210° C. Particles which passed through a 16 mesh (0.991 mm. opening) screen were dried at 120° C. for 15 minutes. These particles were then placed in a mold. The mold was placed in a room temperature resistance heat press at room temperature under 76,000 kPa pressure. Temperature was increased to 177° C. in 20 minutes and then held constant for 100 minutes. The resulting part was postcured under $N_2$ using the following temperature program:

| Time | Temperature |
| --- | --- |
| 0 to 6 hrs. | 23→204° C. |
| 6 to 24 hrs. | 204° C. |
| 24 to 30 hrs. | 204→288° C. |
| 30 to 48 hrs. | 288° C. |

Test samples were then labeled and removed from the postcured sheet as shown in the FIGURE.

The tear test results at room temperature were:

| Direction | Sample | Tear Strength kN/m |
| --- | --- | --- |
| Initial | 3 | 41.67 |
| Initial | 4 | 40.45 |
| Perpendicular | 6 | 40.27 |
| Perpendicular | 8 | 39.22 |
| Perpendicular | 10 | 42.90 |

EXAMPLE 4

Reinforcement By Pulverizing Perfluoroelastomer Without Prior Milling

The annealed slab of Example 1 was pulverized in a hammer mill at −210° C. Particles which passed through a 16 mesh (0.991 mm opening) screen were dried and collected. Pure "Teflon" T8A was fibrillated on the 60° C. rubber roll mills, then annealed and pulverized in the manner described in Example 3 above. Particles of fibrillated "Teflon" which passed through a 16 mesh (0.991 mm opening) screen were dried and collected.

The perfluoroelastomer particles were then mixed with 10.0 pph of "Teflon" T8A powder for 6 minutes on a paint shaker.

This particulate mixture of perfluoroelastomer and fibrillated "Teflon" was then placed in a mold at room temperature. The mold was placed in a resistance heated press at room temperature under 76,000 kPa pressure. Temperature was increased to 177° C. in 20 minutes and then held constant for 100 minutes. The resulting part was postcured under $N_2$ using the following temperature program:

| Time | Temperature |
| --- | --- |
| 0 to 6 hrs. | 23→204° C. |
| 6 to 24 hrs. | 204° C. |
| 24 to 30 hrs. | 204→288° C. |
| 30 to 48 hrs. | 288° C. |

Test samples were then labeled and removed from the postcured sheet as shown in the FIGURE.

The tear test results at room temperature were:

| Direction | Sample | Tear Strength kN/m |
|---|---|---|
| Mill | 2 | 29.24 |
| Mill | 3 | 30.99 |
| Cross Mill | 5 | 24.51 |
| Cross Mill | 7 | 24.51 |
| Cross Mill | 9 | 26.44 |
| Cross Mill | 11 | 31.52 |

EXAMPLE 5

Reinforcement By Pulverizing Milled Perfluoroelastomer at Increased Loadings 40 pph of "Teflon" T8A was milled into Compound I of Example 1 at 60° C. This compound was annealed at 100° C. for 15 minutes and then pulverized in a hammer mill at −210° C. Particles which passed through a 16 mesh (0.991 mm opening) screen were dried. These particles were then placed in a mold at room temperature. The mold was placed in a resistance heated press at room temperature under 76,000 kPa pressure. Temperature was increased to 177° C. in 20 minutes and then held constant for 100 minutes. The resulting part was postcured under $N_2$ using the following temperature program.

| Time | Temperature |
|---|---|
| 0 to 6 hrs. | 23→204° C. |
| 6 to 24 hrs. | 204° C. |
| 24 to 30 hrs. | 204→288° C. |
| 30 to 48 hrs. | 288° C. |

Test samples were then labeled and removed from the postcured sheet as shown in the FIGURE.

The tear test results at room temperature were:

| Direction | Sample | Tear Strength kN/m |
|---|---|---|
| Mill | 2 | 82.82 |
| Mill | 3 | 93.33 |
| Cross Mill | 5 | 75.99 |
| Cross Mill | 7 | 94.03 |
| Cross Mill | 9 | 83.87 |
| Cross Mill | 11 | 81.60 |

Industrial Applicability

The perfluoroelastomer parts produced by the process of the present invention are useful in the manufacture of finished parts such as O-rings, flange seals, gasket stock, pump diaphragms and levers. The extraordinary physical properties and resistance to environmental attack of such parts made from these compositions make them particularly well suited for applications in process streams subject to severe fluid service at inline temperatures as high as 371° C. or in streams carrying highly corrosive fluids, such as hydrogen sulfide; especially in end use application where high multidirectional tear strength is required, such as in certain types of diaphragms.

Best Mode

Although the best mode of the present invention, i.e., the method for producing the best perfluoroelastomer parts, will depend upon the particular desired end use and the specific requisite combination of properties for that use, the single most preferred method of the present invention is that described in detail in Example 3.

I claim:

1. A method for the preparation of perfluoroelastomer parts having high multidirectional tear strength comprising:
    (a) preparing a blend of the perfluoroelastomer with 1 to 40 parts of fibrillated polytetrafluoroethylene,
    (b) cryogenically pulverizing the blend produced from step (a) into a powder,
    (c) placing the powder produced from step (b) into a mold and press-curing the powder into the desired shape for the perfluoroelastomer part.

2. The method of claim 1 wherein the perfluoroelastomer is a terpolymer of tetrafluoroethylene, perfluoro(methyl vinyl ether) and a third monomer selected from the group consisting of:
    (a) perfluoro(4-cyanobutyl vinyl ether),
    (b) perfluoro(4-carbomethoxybutyl vinyl ether),
    (c) perfluoro(2-phenoxypropyl vinyl ether),
    (d) perfluoro(3-phenoxypropyl vinyl ether),
    (e) perfluoro(8-cyano-5-methyl-3,6-dioxa-1-octene), and
    (f) a bromo-containing olefin.

3. The method of claim 1 wherein the powder produced in pulverization step (b) has substantially all of its particles less than 10 mesh in size.

4. The method of claim 2 wherein the third monomer is perfluoro(2-phenoxypropyl vinyl ether).

5. The method of claim 2 wherein the third monomer is perfluoro(8-cyano-5-methyl-3,6-dioxa-1-octene).

6. The method of claim 2 wherein tetrafluoroethylene units comprise 53–79.8 mole percent of the perfluoroelastomer and the perfluoro(methyl vinyl ether) units comprise 20–45 mole percent of the perfluoroelastomer.

7. The method of claim 1 wherein the perfluoroelastomer part produced from step (c) is post cured.

8. A perfluoroelastomer part produced by the method of claim 1.

9. A perfluoroelastomer part of claim 7 which is in the shape of a diaphragm.

10. A perfluoroelastomer diaphragm of claim 9 which has a tear strength as measured by ASTM test D-624-B in both an initial and perpendicular direction of at least 36 kN/m.

* * * * *